US011972374B2

(12) United States Patent
Shao et al.

(10) Patent No.: US 11,972,374 B2
(45) Date of Patent: Apr. 30, 2024

(54) METHOD, INTERNET OF THINGS SYSTEM AND MEDIUM FOR SMART GAS MAINTENANCE MANAGEMENT ORDER DISPATCH WARNING

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Lei Zhang, Chengdu (CN); Yong Li, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/348,387

(22) Filed: Jul. 7, 2023

(65) Prior Publication Data
US 2023/0351276 A1  Nov. 2, 2023

(30) Foreign Application Priority Data

Apr. 17, 2023 (CN) .......................... 202310405143.X (51) Int. Cl.
G06Q 10/0631 (2023.01)
G06Q 10/20 (2023.01)

(52) U.S. Cl.
CPC ....... G06Q 10/06311 (2013.01); G06Q 10/20 (2013.01)

(58) Field of Classification Search
None
See application file for complete search history.

(56) References Cited

U.S. PATENT DOCUMENTS

| 2005/0246112 A1* | 11/2005 | Abhulimen | ......... G01M 3/2815 |
| | | | 73/40 |
| 2011/0178726 A1* | 7/2011 | Dobbs | .................... G01N 23/02 |
| | | | 702/35 |

(Continued)

FOREIGN PATENT DOCUMENTS

| CN | 112241924 A | 1/2021 |
| CN | 113850393 A | 12/2021 |

(Continued)

OTHER PUBLICATIONS

Analysis on Integrated Energy System Cascading Failures Considering Interaction of Coupled Heating and Power Networks; Pan et al; Jul. 23, 2019 (Year: 2019).*

(Continued)

Primary Examiner — Deirdre D Hatcher
(74) Attorney, Agent, or Firm — METIS IP LLC (57) ABSTRACT

A method, an Internet of Things system, and a medium for smart gas maintenance management order dispatch warning are provided. The method comprises: assigning a gas work order to an order receiver in response to an assignment module, and determining an warning characteristic of the gas work order; wherein, determining the warning characteristic of the gas work order comprise: based on the fault location characteristic of the gas work order, determining the traffic warning value through the traffic warning value determination module; determining the fault warning value based on the gas fault characteristic of the gas work order through the fault warning value determination module; in response to the warning monitoring module monitoring that the warning characteristic meet the preset condition, providing a warning to the order receiver by the warning module.

8 Claims, 5 Drawing Sheets

(56) References Cited

U.S. PATENT DOCUMENTS

| | | | |
|---|---|---|---|
| 2018/0259418 A1* | 9/2018 | Dudek | G01M 3/04 |
| 2019/0317869 A1 | 10/2019 | Selvaraj et al. | |
| 2020/0191316 A1* | 6/2020 | Du | G06Q 10/0635 |
| 2023/0079768 A1 | 3/2023 | Shao et al. | |
| 2023/0204165 A1* | 6/2023 | Linford | G08B 21/187 |
| | | | 73/40 |

FOREIGN PATENT DOCUMENTS

| | | |
|---|---|---|
| CN | 114518736 A | 5/2022 |
| CN | 115330278 A | 11/2022 |

OTHER PUBLICATIONS

Dynamic failure probability analysis of urban gas pipeline network; Wang et al; 2021 (Year: 2021).*

Probabilistic Model of Cumulative Damage in Pipelines Using Markov Chains; Casanova-del-Angel et al; 2020 (Year: 2020).*

Risk assessment for cascading failures in regional integrated energy system considering the pipeline dynamics; Liang et al; Feb. 5, 2023 (Year: 2023).*

System-Level Prognosis and Health Monitoring Modeling Framework and Software Implementation for Gas Pipeline System Integrity Management; Chalgham et al; 2020 (Year: 2020).*

Failure modeling of water distribution pipelines using meta-learning algorithms; Almheiri et al; Sep. 2021 (Year: 2021).*

Failure Prediction for Large-scale Water Pipe Networks Using GNN and Temporal Failure Series; Liang et al; Nov. 2021 (Year: 2021).*

Predicting the risk of pipe failure using gradient boosted decision trees and weighted risk analysis; Barton et al; 2022 (Year: 2022).*

First Office Action in Chinese Application No. 202310405143.X dated May 18, 2023, 23 pages.

Notification to Grant Patent Right for Invention in Chinese Application No. 202310405143.X dated Jun. 13, 2023, 5 pages.

Zheng, Weiguo et al., Application of Tour-spot Equipment Inspection System in Changcun Coal Preparation Plant, Coal Engineering, 48(10): 34-36, 2016.

Deng, Guanqian et al., A Survey on Intermittent Fault Diagnosis Technology, Ordnance Industry Automation, 34(1): 15-20, 2015.

Zang, Xiwei, Research and Application of Operation and Maintenance Platform of Digital Smart Pipe Gallery, Digital Technology & Application, 2020, 5 pages.

Liu, Huiquan et al., Integrated Management of Underground Gas Pipeline Network Leak Repair Work, City Gas, 2020, 7 pages.

* cited by examiner

- 210 in response to the distribution module assigning the gas work order to the person receiving the order, determine the warning characteristic of the gas work order
  - 211 through the traffic warning value determination module, determine the traffic warning value based on the fault location characteristic of the gas work order
  - 212 through the fault warning value determination module, determine the fault warning value based on the gas fault characteristic of the gas work order

- 220 in response to the warning monitoring module detecting that the warning characteristic meets the preset condition, the warning module sends a warning to the person receiving the order

Fig. 2

300 determine at least one preferred processing route based on the estimated location distribution — Step 310 determine a traffic warning value based on at least one preferred processing route — Step 320

Fig. 3

400 determine a fault transfer distribution based on the gas fault characteristic — 410 determine a fault warning value based on the fault transfer distribution — 420

METHOD, INTERNET OF THINGS SYSTEM AND MEDIUM FOR SMART GAS MAINTENANCE MANAGEMENT ORDER DISPATCH WARNING

CROSS-REFERENCE TO RELATED APPLICATION

The present application claims priority of Chinese Application No. 202310405143.X, filed on Apr. 17, 2023, the contents of each of which are hereby incorporated by reference.

TECHNICAL FIELD

This disclosure relates to the field of warning of gas order dispatch, and in particular to method, Internet of Things system, and medium for smart gas maintenance management order dispatch warning.

BACKGROUND

The development of the Internet of Things has provided a lot of convenience to people's lives. Many aspects of life and work need to use the Internet of Things to create a more efficient platform. The combination of gas and Internet of Things came into being. As the popularity of gas becomes wider and wider, the problems related to gas are also increasing day by day. For example, in the maintenance and management of gas faults, it often occurs that the actual situation of the order receiver does not match the gas work order, resulting in low work order processing efficiency. If the management platform on the Internet of Things system does not handle the gas work order properly, the work progress of the relevant staff and the user experience will be affected.

Therefore, it is desirable to propose a method, Internet of Things system and media for smart gas maintenance management order dispatch warning, through the gas platform to analyze the characteristic of the content of the gas work order, and issue a warning before dispatching the order, and the platform can automatically and smartly predict the warning results and display, let the order receiver make sufficient preparations, and improve the efficiency of gas problem handling.

SUMMARY

One or more embodiments of this disclosure provide a method for smart gas maintenance management order dispatch warning, which is executed by a processor in the smart gas management platform of the smart gas maintenance management dispatch warning Internet of Things system. The method comprising: determining warning characteristic of gas work order in response to assignment module assigning gas work order to order receiver; Wherein, the warning characteristic comprising at least a traffic warning value and a fault warning value, and determining the warning characteristic of the gas work order comprising: determining the traffic warning value based on the fault location characteristic of the gas work order through the traffic warning value determination module; Through the fault warning value determination module, the fault warning value is determined based on the gas fault characteristic of the gas work order; In response to the warning monitoring module monitoring that the warning characteristic meet the preset condition, the warning module provides a warning to the order receiver.

One of the embodiments of this disclosure provides a smart gas maintenance management order dispatch warning Internet of things system, the system comprising a smart gas user platform, a smart gas service platform, a smart gas management platform, a smart gas sensing network platform, and a smart gas object platform; The smart gas management platform is used to: in response to the assignment module to assigning the gas work order to the order receiver, determine the warning characteristic of the gas work order; wherein, the warning characteristic include at least a traffic warning value and a fault warning value, and determining the warning characteristic of the gas work order comprises: determining the traffic warning value based on the fault location characteristic of the gas work order through the traffic warning value determination module; determining the fault warning value based on a gas fault characteristic of the gas work order through a fault warning value determination module; in response to a warning monitoring module monitoring that the warning characteristic meets a preset condition, provide and warning is proa warning to the order receiver by a warning module order receiver.

One or more embodiments of this disclosure provide a non-transitory computer readable storage medium, the storage medium stores computer instructions, and when the computer reads the computer instructions in the storage medium, the computer executes the method for smart gas maintenance management order dispatch warning.

In some embodiments of this disclosure, the Internet of Things system for smart gas maintenance management order dispatch warning analyzes the characteristic of the gas work order content and the information related to the gas work order, and automatically predicts the warning results smartly for traffic and faults and other situations, notifies the order receiver in time, and assist the order receiver to make sufficient preparations before performing the task of the gas work order, so as to improve the efficiency of handling gas problems.

BRIEF DESCRIPTION OF THE DRAWINGS

This description will be further illustrated by means of exemplary embodiments which will be described in detail through accompanying drawings. These embodiments are not restrictive, in which the same numbering indicates the same structure, wherein.

DETAILED DESCRIPTION

In order to more clearly explain the technical scheme of the embodiment of this description, a brief description of the accompanying drawings required for the embodiment description is given below. Obviously, the accompanying drawings below are only some examples or embodiments of this description, and it is possible for ordinary technicians skilled in the art to apply this description to other similar scenarios according to these accompanying drawings without creative effort. Unless otherwise apparent from context or otherwise indicated, like reference numerals in the figures represent like structures or operations.

It should be understood that the "system", "device", "unit" and/or "module" used in this article are a method used to distinguish different components, elements, parts, portions or assemblies of different levels. However, if other words serve the same purpose, the words may be replaced by other expressions.

As shown in this description and claims, the words "one", "a", "a kind" and/or "the" are not specially singular but may include the plural unless the context expressly suggests otherwise. In general, the terms "comprise" and "include" imply the inclusion only of clearly identified steps and elements that do not constitute an exclusive listing. A method or equipment may also include other steps or elements.

The flowcharts used in the present disclosure illustrate operations that systems implement according to some embodiments of the present disclosure. It should be understood that the previous or subsequent operations may not be accurately implemented in order. Instead, each step may be processed in reverse order or simultaneously. Meanwhile, other operations may also be added to these processes, or a certain step or several steps may be removed from these processes.

Figure 1:
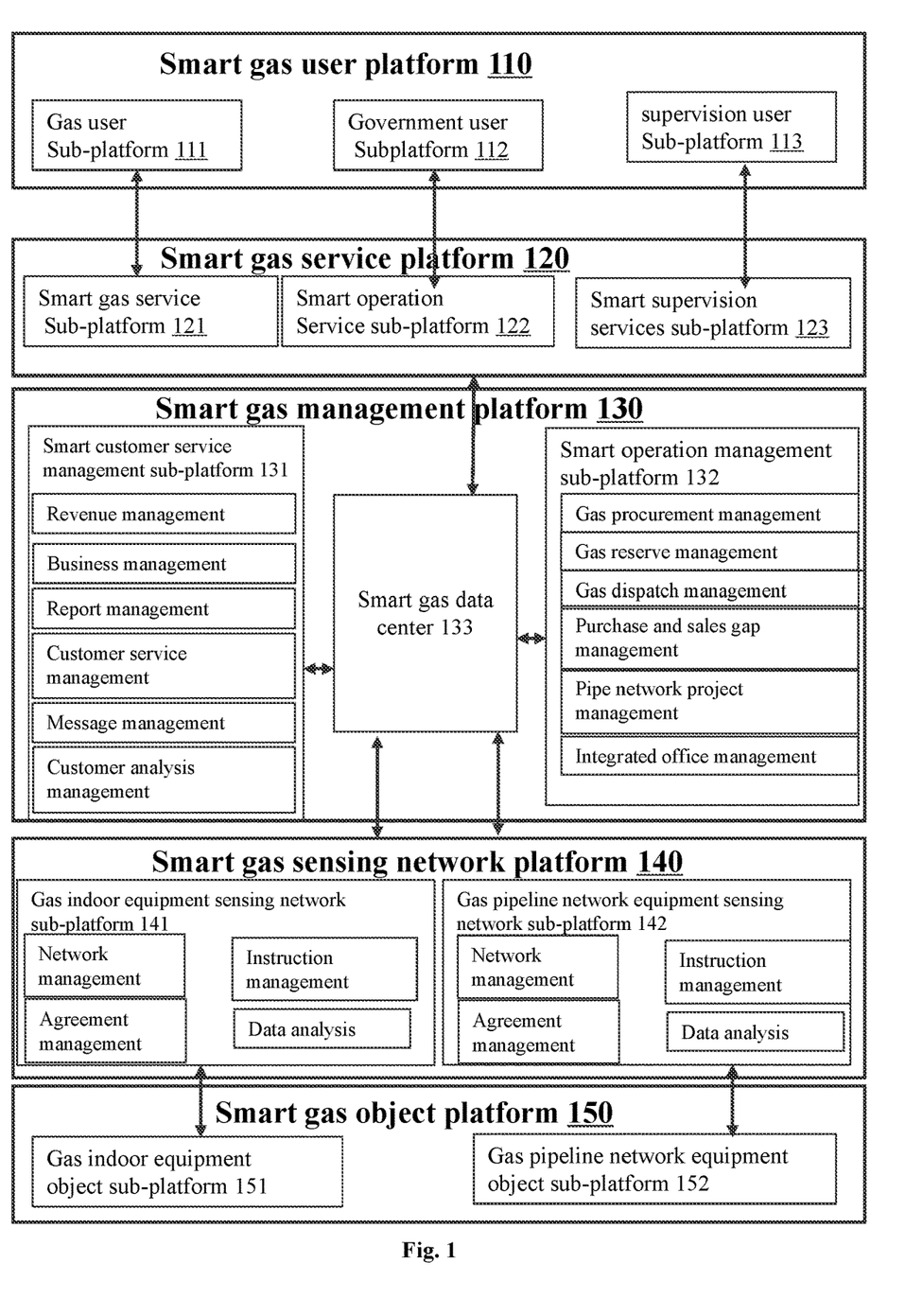
FIG. 1 is a schematic diagram of the platform structure of the smart gas maintenance management order dispatch warning Internet of Things system according to some embodiments of this disclosure.

FIG. 1 is a schematic diagram of the platform structure of the smart gas maintenance management order dispatch warning Internet of Things system according to some embodiments of this disclosure.

In some embodiments, the smart gas maintenance management order dispatch warning system 100 may include a smart gas user platform 110, a smart gas service platform 120, a smart gas management platform 130, a smart gas sensing network platform 140, a smart gas object platform 150.

The smart gas user platform 110 may refer to a platform for obtaining query instructions of gas operation users and transmitting relevant information of gas work order (e.g., warning characteristic of gas work order, etc.) to users. In some embodiments, the smart gas user platform 110 may be configured as a terminal device. In some embodiments, the smart gas user platform 110 may interact with the smart gas service platform 120. In some embodiments, the smart gas user platform 110 may send gas user query instructions to the smart gas service platform 120 and receive information about gas work order uploaded by the smart gas service platform 120.

In some embodiments, the smart gas user platform 110 may include a gas user sub-platform 111, a government user sub-platform 112 and a supervision user sub-platform 113. In some embodiments, the gas user sub-platform 111 may interact with the smart gas service sub-platform 121 to obtain services for safe gas consumption; The government user sub-platform 112 may interact with the smart operation service sub-platform 122 to obtain gas operation services. In some embodiments, the supervision user sub-platform 113 may interact with the smart supervision service sub-platform 123 to obtain services required by safety supervision.

Figure 2:
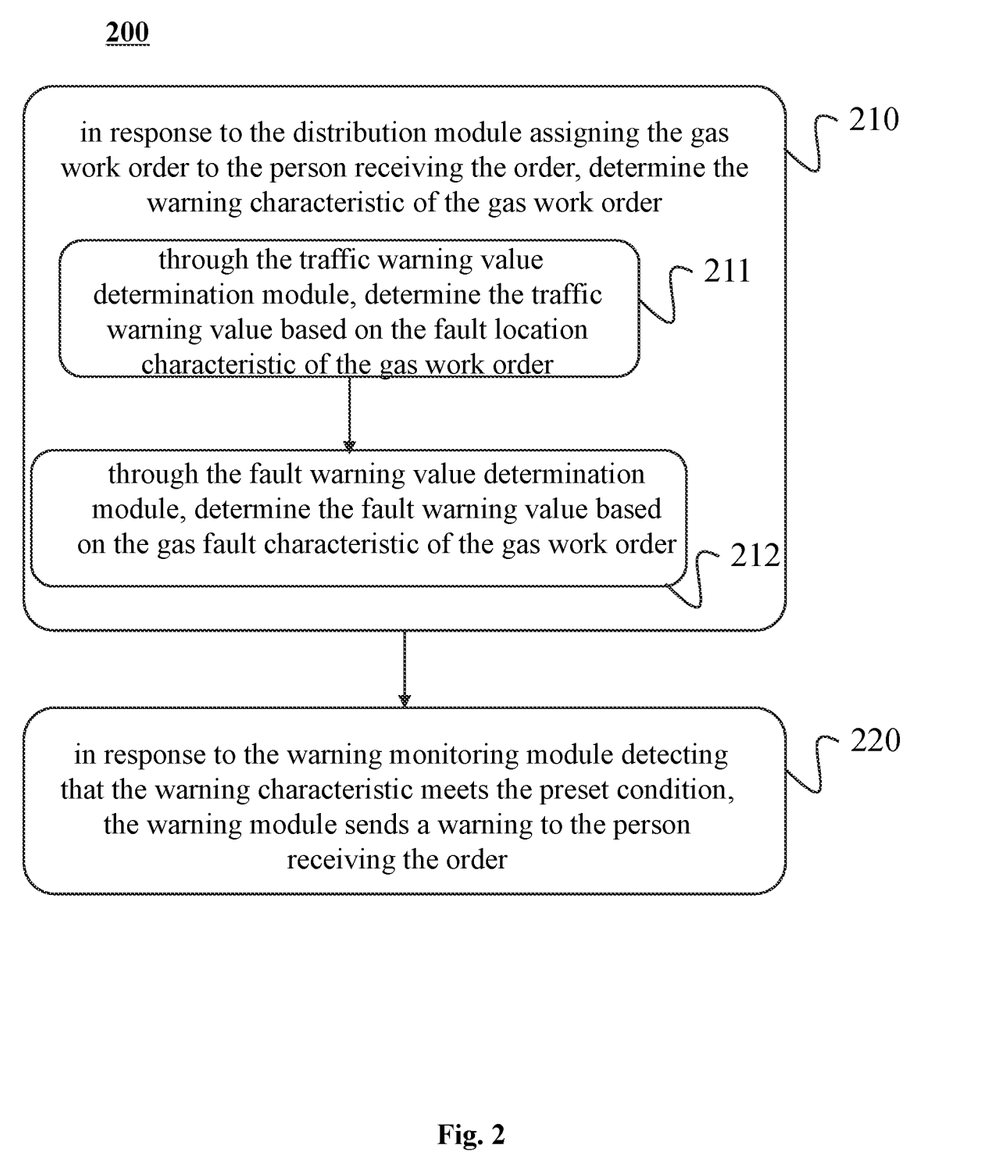
FIG. 2 is an exemplary flow chart of a method for smart gas maintenance management order dispatch warning according to some embodiments of this disclosure.

For more information about the warning characteristic of the gas work order, please refer to FIG. 2 and its related description.

The smart gas service platform 120 may refer to a platform for receiving and transmitting data and/or information such as consulting information, query instructions, and troubleshooting solutions.

In some embodiments, the smart gas service platform 120 may include a smart gas service sub-platform 121, a smart operation service sub-platform 122 and a smart supervision service sub-platform 123. In some embodiments, the smart gas service sub-platform 121 may interact with the gas user sub-platform 111 to provide gas users with gas equipment-related information; The smart operation service sub-platform 122 may interact with the government user sub-platform 112 to provide government users with gas operation-related information; The smart supervision service sub-platform 123 may interact with the supervision user sub-platform 113 to provide supervision users with safety supervision-related information.

In some embodiments, the smart gas service platform 120 may interact with the smart gas user platform 110 and the smart gas management platform 130 respectively. In some embodiments, the smart gas service platform 120 may issue a query command of a gas operation user to the smart gas data center 133, and receive relevant information of a gas work order uploaded by the smart gas data center 133. For the interaction method between the smart gas service platform 120 and the smart gas user platform 110, please refer to the related content above.

The smart gas management platform 130 may refer to a platform that coordinates and coordinates the connection and collaboration between various functional platforms, gathers all the information of the Internet of Things, and provides perception management and control management functions for the operation system of the Internet of Things. In some embodiments, the smart gas management platform 130 may be configured to implement a method for smart gas maintenance management order dispatch warning.

For more information about the method for smart gas maintenance management order dispatch warning, please refer to FIG. 2-FIG. 6 and their related descriptions.

In some embodiments, the smart gas management platform 130 may include a smart customer service management sub-platform 131, a smart operation management sub-platform 132 and a smart gas data center 133.

In some embodiments, the smart gas management platform 130 interacts with the smart gas service platform 120 and the smart gas sensing network platform 140 through the smart gas data center 133. In some embodiments, the smart gas data center 133 may issue instructions to obtain relevant data of gas equipment (such as gas fault characteristic of different gas work orders, etc.) to the smart gas sensing network platform 140, and receive the smart gas sensing related data of the gas equipment uploaded by the network platform 140. For the interaction method between the smart gas data center 133 and the smart gas service platform 120, please refer to the related content above.

In some embodiments, the smart customer service management sub-platform 131, the smart operation management sub-platform 132 and the smart gas data center 133 are independent of each other. In some embodiments, the smart customer service management sub-platform 131 and the smart operation management sub-platform 132 may interact with the smart gas data center 133 bidirectionally. In some embodiments, the smart gas data center 133 may send the data related to the gas work order of the gas operation user to the smart customer service management sub-platform 131 and the smart operation management sub-platform 132 for analysis and processing, and accept the smart customer service management sub-platform 131 and the relevant information of the gas work order processed by the smart operation management sub-platform 132.

In some embodiments, the smart customer service management sub-platform 131 may include a message management module. The message management module may be used to push notifications related to gas work order (such as notifications of new and/or postponed tasks to be processed, notifications of gas outages, etc.), and may also be used to send equipment monitoring alarms, gas security inspection monitoring alarms, and gas consumption Gas abnormalities and other messages are delivered to gas operating users.

In some embodiments, the message management module may include a distribution module and an alert module. The distribution module may be used to distribute gas work order to order receiver. The warning module may be used to give warning to order receiver.

In some embodiments, the smart operation management sub-platform 132 may include a comprehensive office management module. The comprehensive office management module may be used to coordinate the operation of human resources, public resources, gas equipment, daily office, administrative management and other affairs.

In some embodiments, the integrated office management module may include a warning monitoring module, a traffic warning value determination module, and a fault warning value determination module. The warning monitoring module may be used to monitor the warning characteristic of gas work order. The traffic warning value determination module can be used to determine the traffic warning value. The fault warning value module may be used to determine the fault warning value.

For more information about the traffic warning value and its determination method, the fault warning value and its determination method, please refer to FIGS. 2-6 and their related descriptions.

The smart gas sensing network platform 140 may refer to a platform for unified management of sensor communication. In some embodiments, the smart gas sensing network platform 140 may be configured as a communication network and a gateway, and multiple sets of gateway server s or multiple sets of intelligent routers may be used, which are not limited here.

In some embodiments, the smart gas sensing network platform 140 may interact with the smart gas management platform 130 and the smart gas object platform 150. In some embodiments, the smart gas sensing network platform 140 may issue an instruction to acquire relevant data of gas equipment to the smart gas object platform 150 and receive relevant data of gas equipment uploaded by the smart gas object platform 150. For the interaction method between the smart gas sensing network platform 140 and the smart gas data center 133, please refer to the related content above.

In some embodiments, the smart gas sensing network platform 140 may include a gas indoor equipment sensing network sub-platform 141 and a gas pipeline network equipment sensing network sub-platform 142. In some embodiments, the gas indoor equipment sensing network sub-platform 141 may interact with the gas indoor equipment object sub-platform 151 to obtain relevant data of indoor equipment; The gas pipeline network equipment sensing network sub-platform 142 may interact with the gas pipeline network equipment object sub-platform 152 to obtain relevant data of the pipeline network equipment.

The smart gas object platform 150 may refer to a platform for acquiring relevant data of gas equipment. In some embodiments, the smart gas object platform 150 may be configured as various devices. For example, indoor equipment (such as metering equipment, etc.), pipe network equipment (such as valve control equipment, etc.), monitoring equipment (such as temperature sensors, etc.), etc.

In some embodiments, the smart gas object platform 150 may interact with the smart gas sensing network platform 140, and for the specific interaction method, refer to the related content above.

In some embodiments, the smart gas object platform 150 may include a gas indoor equipment object sub-platform 151 and a gas pipeline network equipment object sub-platform 152. In some embodiments, the gas indoor equipment object sub-platform 151 may obtain relevant data of indoor equipment, and upload it to the smart gas data center 133 through the gas indoor equipment sensing network sub-platform 141. In some embodiments, the gas pipeline network equipment object sub-platform 152 may obtain relevant data of the pipeline network equipment, and upload it to the smart gas data center 133 through the gas pipeline network equipment sensing network sub-platform 142.

Some embodiments of this disclosure use the Internet of Things functional architecture of five platforms to build a smart gas maintenance management order dispatch warning Internet of Things system 100, and adopt the method of combining the general platform and sub-platforms, which may not only share the data processing pressure of the general platform, and may guarantee the independence of each data, ensure the classification and transmission of data, traceability, and the classification and processing of instructions, making the structure and data processing of the Internet of Things clear and controllable, and facilitating the management and control and data processing of the Internet of Things. In addition, the smart gas object platform and different gas user platforms form a closed loop of different information operations, which may be coordinated and regularly operated under the unified management of the smart gas management platform, realizing the informatization and intelligence of gas operation management.

FIG. 2 is an exemplary flow chart of a method for smart gas maintenance management order dispatch warning according to some embodiments of the present disclosure. In some embodiments, the process 200 may be executed by a processor in the smart gas management platform 130. As shown in FIG. 2, the process 200 includes the following steps.

Step 210, in response to the distribution module assigning the gas work order to the person receiving the order, determine the warning characteristic of the gas work order.

For more information about the assignment module, see FIG. 1 and its related description.

The warning characteristic refers to the reference factors related to the gas work order and used to judge whether it is necessary to give a warning to the order receiver. For example, the warning characteristic may include a geographical characteristic corresponding to the maintenance location of the gas work order, a time characteristic corresponding to the maintenance time, a personnel characteristic corresponding to the maintenance personnel, and the like.

In some embodiments, the warning characteristic includes at least a traffic warning value and a fault warning value.

The traffic warning value is used to describe the degree of warning for traffic condition. The traffic warning value may be expressed by numerical value, the larger the numerical value, the worse the traffic condition.

The fault warning value is used to describe the degree of warning for gas fault condition. The fault warning value may be represented by a numerical value, and the larger the numerical value, the more serious the gas fault is.

In some embodiments, the smart gas management platform 130 may determine the traffic warning value and fault warning value of the gas work order through the following steps 211 to 212.

Step 211, through the traffic warning value determination module, determine the traffic warning value based on the fault location characteristic of the gas work order.

For more information about the traffic warning value determination module, please refer to FIG. 1 and its related description.

The fault location characteristic is used to characterize the relevant information of the location where the gas fault occurs. In some embodiments, the fault location characteristic includes at least the location of the gas fault.

In some embodiments, the smart gas management platform 130 may extract information related to the location of the gas fault according to the location of the gas fault in the gas work order, and summarize it as a characteristic of the location of the fault.

In some embodiments, the smart gas management platform 130 may use the current location of the person receiving the gas work order as the starting point; use the specific location where the gas fault occurs in the fault location characteristic as the end point; and based on the traffic congestion from the start point to the end point, determine the traffic warning value. Among them, traffic congestion may be measured by factors such as the average traffic flow, the number of traffic lights, and the average waiting time for red lights on the roads from the start point to the end point. In some embodiments, the more serious the traffic congestion, the greater the traffic warning value.

In some embodiments, the smart gas management platform 130 may determine the traffic warning value based on the estimated location distribution included in the fault location characteristic. For more information about the estimated location distribution and determining the traffic warning value based on the estimated location distribution, please refer to FIG. 3 and its related descriptions.

Step 212, through the fault warning value determination module, determine the fault warning value based on the gas fault characteristic of the gas work order.

For more information about the fault warning value determination module, please refer to FIG. 1 and its related descriptions.

The gas fault characteristic is used to characterize the relevant information of the gas fault. In some embodiments, the gas fault characteristic includes at least a fault type of the gas fault (also referred to as gas fault type).

In some embodiments, the smart gas management platform 130 may extract information related to gas faults according to the gas faults in the gas work order, and summarize them as gas fault characteristic(s).

In some embodiments, the smart gas management platform 130 may preset different fault warning values according to different gas fault types, and then directly determine the corresponding fault warning values based on the gas fault types in the gas fault characteristic. Wherein, the fault warning value may be determined based on the severity of consequences caused by different fault types of gas faults. If the consequences are more serious, the fault warning value will be larger.

In some embodiments, the smart gas management platform 130 may determine a fault transfer distribution based on gas fault characteristic, and then determine the fault warning value. For more information about the fault transfer distribution and determining the fault warning value based on the fault transfer distribution, refer to FIG. 4 and its related descriptions.

Step 220, in response to the warning monitoring module detecting that the warning characteristic meets the preset condition, the warning module sends a warning to the person receiving the order.

For more information about the warning monitoring module and the warning module, please refer to FIG. 1 and its related descriptions.

In some embodiments, the preset condition includes that the traffic warning value is greater than the traffic warning threshold or the fault warning value is greater than the fault warning threshold.

In some embodiments, the traffic warning threshold and the fault warning threshold may be preset according to prior experience.

In some embodiments, the traffic warning threshold is related to the traffic congestion dispersion degree of at least one priority processing route at a future moment.

In some embodiments, the greater the degree of traffic congestion dispersion of at least one priority processing route in the future, the more unstable the traffic condition of the at least one priority processing route in the future, the smaller the traffic warning threshold.

Figure 3:
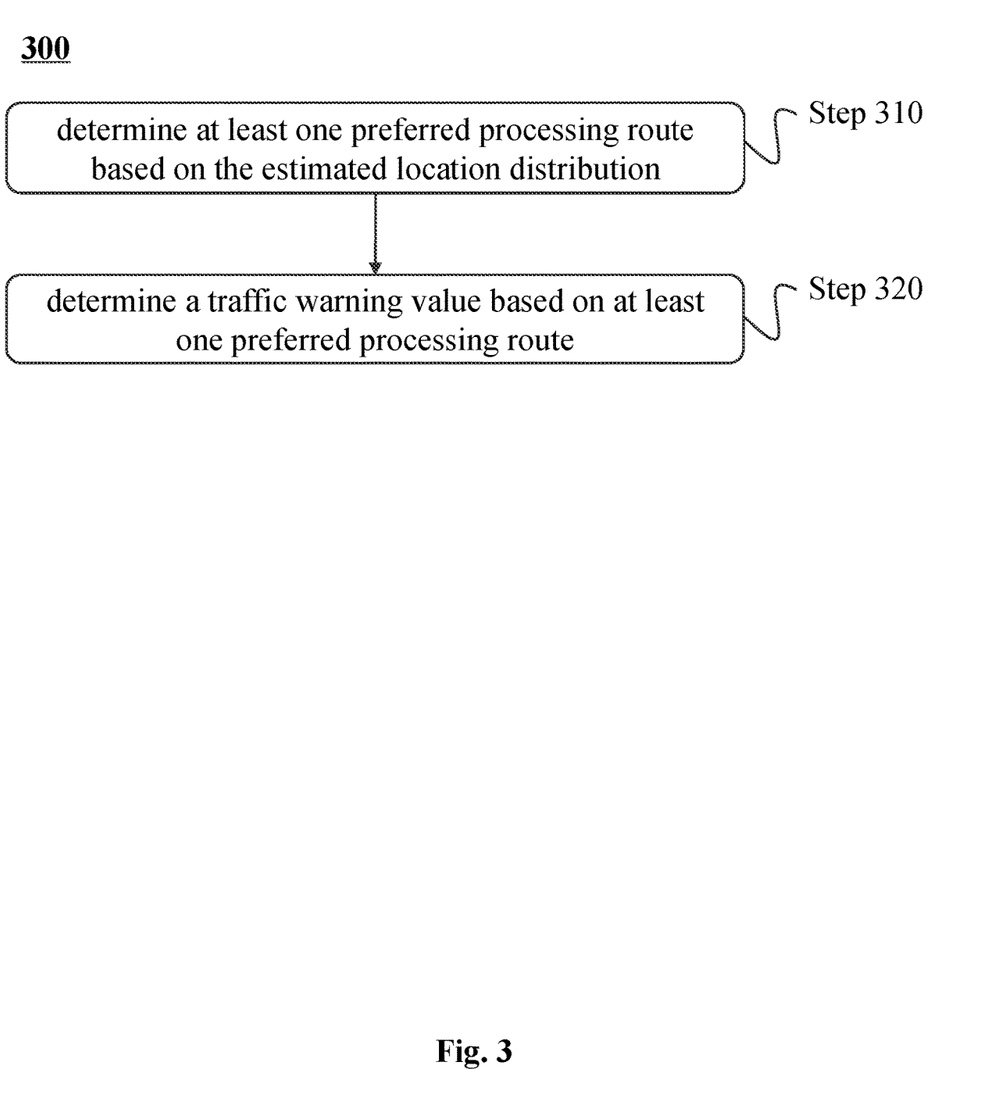
FIG. 3 is an exemplary flowchart of determining a traffic warning value according to some embodiments of the present disclosure.

For more information about the priority processing route and the traffic congestion dispersion degree of the priority processing route at a future moment, please refer to FIG. 3 and its related descriptions.

In some embodiments of this disclosure, when determining the traffic warning threshold, the traffic congestion dispersion degree of at least one priority processing route at a future time is introduced, fully considering the stability of the traffic condition of at least one priority processing route at a future time. If the degree of traffic congestion dispersion is greater, it means that the traffic condition is more unstable. At this time, appropriately lowering the traffic warning threshold may avoid severe traffic congestion as much as possible during the processing of the gas work order and improve the processing efficiency of the gas work order.

In some embodiments, the fault warning threshold is related to a fault transfer distribution.

In some embodiments, when in the fault transfer distribution, the closer the future time when the gas fault may be transferred to the current time, the higher the severity of the gas fault, the greater the transfer probability of the gas fault at the future time, and the lower the fault warning threshold is.

Figure 4:
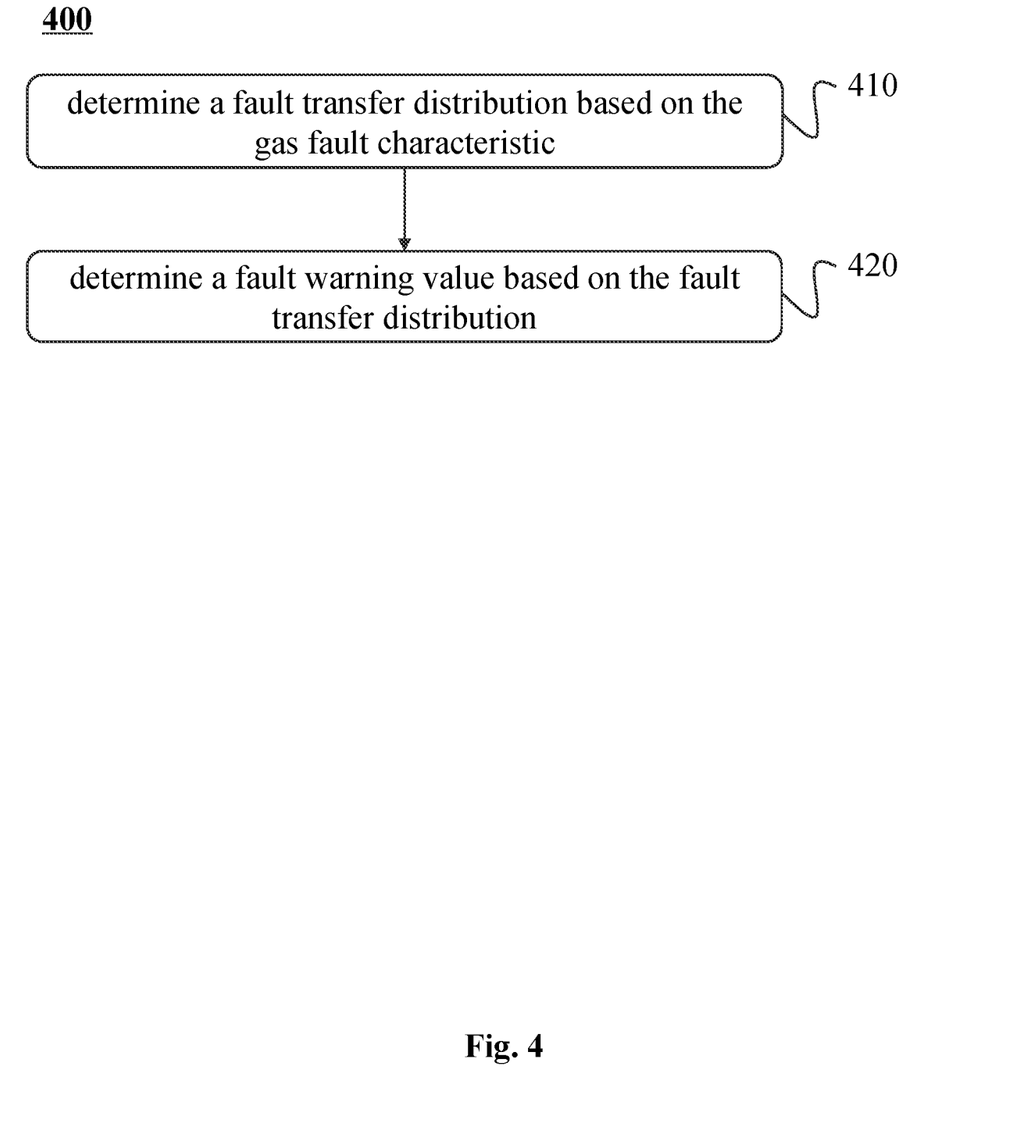
FIG. 4 is an exemplary flow chart of determining a fault warning value according to some embodiments of the present disclosure.
Figure 5:
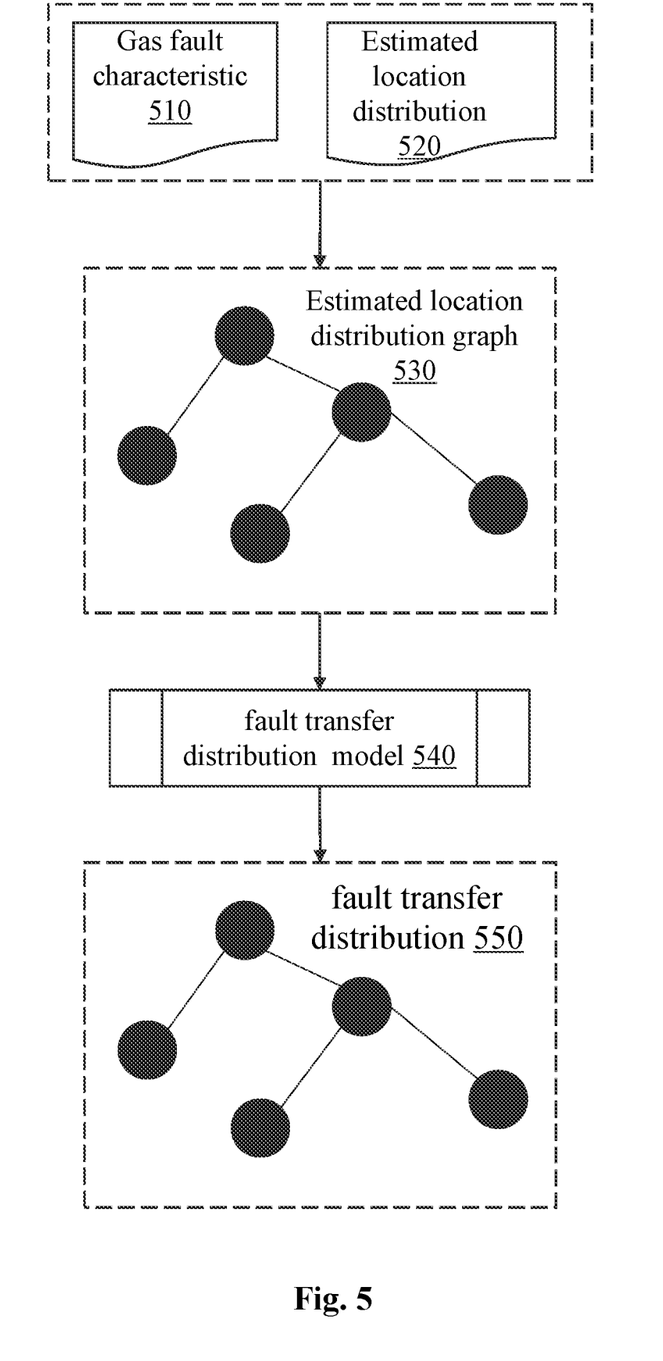
FIG. 5 is an exemplary diagram of a fault transfer distribution model according to some embodiments of the present disclosure.

For more on the distribution of fault transfer distributions, the severity of gas faults, see FIGS. 4, 5 and their related descriptions.

In some embodiments of this disclosure, when determining the fault warning threshold, the fault transfer distribution is introduced, which may provide warning for gas faults with a high probability of occurrence and serious consequences in the future, prevent problems before they happen, and improve the safety of gas consumption. And the loss caused by gas fault may be reduced as much as possible.

FIG. 3 is an exemplary flow chart of determining a traffic warning value according to some embodiments of the present disclosure. In some embodiments, the process 300 may be executed by a processor in the smart gas management platform 130. As shown in FIG. 3, the process 300 includes the following steps.

Step 310: determine at least one priority processing route based on the estimated location distribution.

In some embodiments, the fault location characterization also includes an estimated location distribution. See FIG. 2 and its related description for more information about fault location characteristic.

The estimated location distribution is used to reflect the relevant situation of the location where the gas fault occurs. In some embodiments, the distribution of predicted locations includes at least one predicted location and its predicted probability.

Estimated locations refer to current and future locations where gas faults may occur. The estimated probability refers to the probability of a gas fault occurring at the estimated location.

In some embodiments, the smart gas management platform 130 may determine the location where a gas fault has occurred currently as the first type of estimated location, and the estimated probability of this type of estimated location is 100%.

In some embodiments, the smart gas management platform 130 may determine the surrounding or associated location of the location where the gas fault has occurred as the second type of estimated location, and the estimated probability of this type of estimated location may be determined based on a distance or correlation between the second type of estimated location and the first type of estimated location. The closer the distance or the higher the correlation, the higher the estimated probability.

Correlation refers to the degree of correlation between the first type of estimated location and the second type of estimated location. In some embodiments, the correlation may be preset based on a priori experience. For example, the first type of estimated location is a gas terminal, and the second type of estimated location is a gas inlet pipeline, or a gas transportation pipeline connected to a gas terminal, which is highly correlated with the first type of estimated location.

In some embodiments, the smart gas management platform 130 may determine the estimated probability of the second type of estimated location based on historical data. For example, the smart gas management platform 130 may preset estimated probabilities for the second type of estimated locations according to the number of historical gas faults at different locations.

The priority processing route refers to an optimal route that traverses all estimated locations and does not repeat.

In some embodiments, the smart gas management platform 130 may determine the order of going to different estimated locations based on the estimated location distribution and according to the estimated probability, and then generate at least one priority processing route based on the order. For example, the higher the estimated probability, the higher the order of going to the corresponding estimated location. In some embodiments, when the estimated probabilities of a plurality of estimated locations are the same, one of the estimated locations may be randomly selected as the priority location in a priority processing route.

In some embodiments, the smart gas management platform 130 may determine at least one priority processing route based on the estimated location distribution through the following sub-steps 311 to 313 (not shown in the figure).

In sub-step 311, a plurality of candidate processing routes are generated based on the estimated location distribution.

A candidate processing route refers to a candidate route that may be used as a priority processing route.

In some embodiments, the smart gas management platform 130 may automatically generate a plurality of candidate processing routes based on the estimated location distribution. For example, the smart gas management platform 130 may automatically generate non-repetitive candidate processing routes that traverse each estimated location through permutation and combination according to the different order of going to each estimated location.

Sub-step 312, based on the traffic congestion value and fault handling priority value of each candidate processing route, determine the evaluation value of each candidate processing route.

The traffic congestion value refers to the value obtained after quantifying the traffic congestion on the candidate processing route.

In some embodiments, the traffic congestion value may be determined based on the total number of traffic lights on the candidate processing route, the average waiting time of traffic lights, the length of a certain road section, and the future congestion probability of this section of road. The future congestion probability of the road may be positively related to the average traffic flow of the road.

In some embodiments, the traffic congestion value of each candidate processing route may be calculated by the following formula (1):

$$\text{traffic congestion value} = A \times B + \pi(C \times D) \quad (1)$$

where, A represents the total number of traffic lights on the candidate processing route, B represents the average waiting time of traffic lights on the candidate processing route, C represents the length of a certain road on the candidate processing route, and D represents the future congestion probability of this road.

The fault handling priority value refers to a numerical value obtained by quantifying the priority of going to an estimated location with a higher estimated probability.

In some embodiments, the fault handling priority value may be determined based on the estimated probability of the estimated location on the candidate processing route and the processing order value of the estimated location. The processing sequence value of the estimated location refers to the order of going to the estimated location on the candidate processing route. For example, if a certain estimated location is the first location to go to on the candidate processing route, the processing sequence value of the estimated location is 1.

In some embodiments, the fault handling priority value of each candidate processing route may be calculated by the following formula (2):

$$\text{fault handling priority value} = \Sigma(E \times F) \quad (2)$$

where, E represents the estimated probability of a certain estimated location, and F represents the processing sequence value of the estimated location.

In some embodiments, a fault handling priority value is associated with a fault transfer distribution.

In some embodiments, in the fault transfer distribution, if the future time when a gas fault at an estimated location may be transferred is closer to the current time, the severity of the gas fault is higher, the transition probability of gas fault at the future time is greater, the proportion of the estimated location-associated information when calculating the fault handling priority value is greater. For example, in the following formula (3), the calculated value of the relevant parameter of the estimated location has a greater weight in the summation formula.

In some embodiments, the fault handling priority value of each candidate processing route may be calculated by the following formula (3):

$$\text{fault handling priority value} = \Sigma\{[k1\times(\text{at a predicted location}+k2\times(e1\times p21+e2\times p22+\ldots)+k3\times(e1\times p31+e2\times p32+\ldots)]\times F\} \quad (3)$$

Where, F denotes the processing sequence value of the estimated location. For the meanings and determination methods of k1, k2, k3, e1, e2, p11, p12, p21, p22, p31, and p32, refer to FIG. 4 and related descriptions.

For more information on the distribution of fault transfer and the severity of gas faults, refer to FIG. 4, FIG. 5 and their related descriptions.

In some embodiments of this disclosure, when determining the fault handling priority value, the fault transition distribution is introduced, and the probability of gas faults and their consequences that may occur on the candidate processing route may be further considered, and the future occurrence probability is higher and the consequences are prioritized. For more serious gas faults, increasing the proportion of the estimated location of such gas faults in the fault handling priority value may make the finally determined fault handling priority value more accurate and reasonable.

The evaluation value of the candidate processing route is used to evaluate the overall situation of the candidate processing route. The larger the evaluation value, the better the route.

In some embodiments, the evaluation value of the candidate processing route is negatively correlated with the traffic congestion value of the candidate processing route, and is positively correlated with the fault handling priority value of the candidate processing route.

Step 313: determine at least one priority processing route based on the evaluation value.

In some embodiments, the smart gas management platform 130 may use the candidate processing route with the highest evaluation value as the priority processing route. The smart gas management platform 130 may use a candidate processing route whose evaluation value is greater than a preset threshold as a priority processing route.

Step 320: determine a traffic warning value based on at least one priority processing route.

For more information about the traffic warning value, please refer to FIG. 2 and its related description.

In some embodiments, the smart gas management platform 130 may obtain the traffic congestion value of each priority processing route based on at least one priority processing route, calculate the average value of a plurality of traffic congestion values, and use the average value as the traffic warning value.

In some embodiments, the smart gas management platform 130 may determine the traffic warning value based on the quantity of at least one priority processing route, traffic congestion information, and traffic congestion dispersion degree at a future moment.

In some embodiments, the smart gas management platform 130 may sum the number of priority processing routes, traffic congestion information, and traffic congestion dispersion degree at a future moment, and use the sum result as a traffic warning value.

The traffic congestion information refers to information related to the traffic congestion situation on the priority handling route.

In some embodiments, the traffic congestion information may be represented by a traffic congestion value. In some embodiments, for the traffic congestion information of the plurality of priority processing routes, the smart gas management platform 130 may obtain the traffic congestion value of each of the priority processing routes, calculate an average value of the plurality of traffic congestion values, and use the average value as the traffic congestion information of the plurality of priority processing routes.

The degree of traffic congestion dispersion refers to the traffic congestion dispersion situation of each priority processing route at the future moment.

In some embodiments, the smart gas management platform 130 may determine the traffic congestion dispersion degree of at least one priority processing route at a future time based on the traffic congestion value of each priority processing route at different future moments.

In some embodiments, the traffic congestion dispersion degree of at least one priority processing route at a future moment may be represented by a variance. For example, the smart gas management platform 130 may obtain the traffic congestion values of each priority processing route at different future moments, calculate the variance of the traffic congestion values of each priority processing route at different future moments, and take the sum of the variances of all priority processing routes as the degree of traffic congestion dispersion of these priority processing routes at future times.

In some embodiments of this disclosure, the traffic warning value is determined based on the number of at least one priority processing route, traffic congestion information, and the degree of traffic congestion dispersion in the future, which may fully consider all the current and future possible existence of all priority processing routes. According to the traffic situation, sufficient influencing factors are introduced to improve the accuracy and rationality of the determined traffic warning value.

FIG. 4 is an exemplary flowchart for determining fault warning values according to some embodiments of the disclosure. In some embodiments, the process 400 may be executed by a processor in the smart gas management platform 130. As shown in FIG. 4, the process 400 includes the following steps.

Step 410, determine a fault transfer distribution based on the gas fault characteristic.

For more on gas fault characteristic, see FIG. 2 and its related description.

The fault transfer distribution is used to reflect the situation related to the possible transfer of a gas fault after it has occurred. The gas fault occurrence transfer refers to the situation that after the gas fault corresponding to the gas fault characteristic occurs, the gas fault that has occurred may cause other potential gas faults.

In some embodiments, the fault transfer distribution includes the gas fault characteristic corresponding to the gas fault, the severity of that gas fault, a future moment at which that gas fault may be transferred, and the transfer probability of that gas fault being transferred at that future moment.

The severity of the gas fault is the severity of the consequences caused by the gas fault, comprising the severity of the consequences directly caused by the gas fault and the severity of the consequences caused by the transfer of the gas fault.

In some embodiments, the smart gas management platform 130 may pre-determine the severity of different gas faults based on the possible consequences of different gas faults.

In some embodiments, fault transfer distributions may be represented in various ways. For example, the fault transfer distribution may be represented by a matrix, the fault transfer distribution may be $$\begin{pmatrix} e1 & t1 & p11 & t2 & p21 & t3 & p31 \\ e2 & t1 & p12 & t2 & p22 & t3 & p32 \end{pmatrix},$$

where the number of rows of the matrix represents the number of gas faults included in the fault transfer distribution, and the matrix represents that the fault transfer distribution includes two gas faults, i.e., gas fault 1 and gas fault 2, respectively; the severity of gas fault 1 is e1 and the severity of gas fault 2 is e2; the probability of transfer of gas fault 1 at moment t1 is p11, the probability of transfer of gas fault 1 at moment t2 is p21, the transfer probability of gas fault 1 at the moment of t3 is p31; the transfer probability of gas fault 2 at the moment of t1 is p12, the transfer probability of gas fault 2 at the moment of t2 is p22, and the transfer probability of gas fault 2 at the moment of t3 is p32.

In some embodiments, the smart gas management platform 130 may determine the location of the occurrence of the gas fault corresponding to the gas fault characteristic based on the gas fault characteristic and the fault location characteristic corresponding to the gas work order, obtain historical fault data for the location and the surrounding locations, and determine the fault transfer distribution based on the historical fault data. For example, based on the current gas fault and its occurrence location, the historical fault data of the location is obtained, the fault that is the same as the current gas fault in the historical fault of the location is screened as a target gas fault, and the historical fault transfer of the target gas fault is used as the fault transfer distribution of the current gas fault.

In some embodiments, the smart gas management platform 130 may determine the fault transfer distribution based on gas fault characteristic and estimated location distribution.

For more on the estimated location distribution, see FIG. 3 and its related description.

In some embodiments, the smart gas management platform 130 may construct an estimated location distribution graph based on the gas fault characteristic and the estimated location distribution, and process the estimated location distribution graph by a fault transfer distribution model to determine the fault transfer distribution.

For more on the estimated location distribution graph and how it is constructed, the fault transfer distribution model, and the determination of the fault transfer distribution based on the fault transfer distribution model, see FIG. 5 and its related description.

In some embodiments of the disclosure, the gas fault characteristic reflects the relevant situation of the gas faults that have occurred, and the estimated location distribution reflects the relevant situation of the surrounding location where the gas faults have occurred, i.e., the situation of the potential gas faults at the surrounding location. When determining the fault transfer distribution, the estimated location distribution is further considered on the basis of the gas fault characteristic, which may take into account both the gas faults that have occurred and the potential gas faults, and improve the accuracy and scientificity of the fault transfer distribution.

Step 420: determine a fault warning value based on the fault transfer distribution.

For more information about the fault warning value, please refer to FIG. 2 and its related description.

In some embodiments, the smart gas management platform 130 may determine the fault warning value based on the severity of the gas fault in the fault transfer distribution and the transition probability that the gas fault will be transferred at a certain point in the future. For example, for the future time t1, the fault warning value=e1×p11+e2×p12.

In some embodiments, the smart gas management platform 130 may determine the fault warning value based on the fault transfer distribution through the following sub-steps 421-423 (not shown in the figure).

Sub-step 421, obtain the current fault moment.

The current fault time refers to the actual occurrence moment of the gas fault included in the fault transfer distribution. For example, the actual occurrence moment t0 of gas fault 1.

Sub-step 422, determines at least one future fault moment based on the fault transfer distribution.

The future fault moment refers to the future moment when the gas fault is transferred. For example, the future moment t1.

In some embodiments, the smart gas management platform 130 may directly determine at least one future fault moment based on the distribution of fault transfers.

Sub-step 423, determine the fault warning value based on the time interval between the current fault moment and at least one future fault moment.

In some embodiments, the smart gas management platform 130 may determine the fault warning value through various feasible calculation methods based on the time interval between the current fault moment and at least one future fault moment.

In some embodiments, the fault warning value may be calculated by the following formula (4):

$$\text{fault warning value} = k1 \times (e1 \times p11 + e2 \times p12 + \ldots) + k2 \times (e1 \times p21 + e2 \times p22 + \ldots) + k3 \times (e1 \times p31 + e2 \times p32 + \ldots) + \quad (4)$$

Wherein, k1, k2, k3 are the weight values corresponding to moments t1, t2, t3, respectively, and the weight values are determined based on the time interval between the current fault moment and at least one future fault moment. The smaller the time interval between the current fault moment and the future fault moment, the larger the corresponding weight value.

In some embodiments of the disclosure, when determining the fault warning value, the time interval between the current fault moment and the future fault moment is further considered, and when the severity and transfer probability of different gas faults are the same, the closer the future moment when the gas fault occurs to transfer is to the current moment, then it will be prioritized, thus improving the accuracy of the fault warning value and ensuring the timeliness of the warning.

It should be noted that, the above descriptions about the process 300, the process 400, and the process 500 are only for illustration and description, and do not limit the scope of application of the disclosure. For those skilled in the art, various modifications and changes may be made to the process 300, the process 400, and the process 500 under the guidance of the disclosure. However, such modifications and changes are still within the scope of this disclosure.

FIG. 5 is an exemplary schematic diagram of a fault transfer distribution model shown in accordance with some embodiments of the disclosure.

In some embodiments, the smart gas management platform 130 may construct an estimated location distribution graph based on the gas fault characteristic and the estimated location distribution, and process the estimated location distribution graph by a fault transfer distribution model to determine the fault transfer distribution.

For more on gas fault characteristic, see FIG. 2 and its related description. For more on the estimated location distribution, see FIG. 3 and its related description.

The estimated location distribution graph is a graph that reflects the relationship between various factors in symbolic form, constructed based on gas fault characteristic and estimated location distributions. As shown in FIG. 5, the estimated location distribution graph 530 is constructed based on the gas fault characteristic 510 and the estimated location distribution 520.

The estimated location distribution graph includes nodes and edges.

A node refers to an estimated location, and an estimated location corresponds to a node. For more information about the estimated location, please refer to FIG. 3 and its related description.

The properties of nodes include node type, gas fault characteristic and gas monitoring data.

The node type refers to the type of the estimated location corresponding to the node. For example, the node type may be a gas transportation pipeline or a gas terminal.

The gas fault characteristic includes the fault type of the gas fault currently occurring on the node. In some embodiments, if no gas fault occurs at the node, the fault type may be no gas fault occurs.

The gas monitoring data refers to the gas related data obtained by monitoring the estimated location corresponding to the node. In some embodiments, nodes of different node types have different monitoring data. For example, if the node type is a transportation pipeline, the gas monitoring data may include gas flow rate, temperature, pressure, etc. For another example, if the node type is a gas terminal, the gas monitoring data may include the current combustion calorific value of the gas, the set size of the combustion firepower, and the like.

Edges may reflect the connections between different nodes, comprising physical connections and logical connections.

The physical connection relationship refers to the relationship between two nodes that are directly connected.

The logical connection relationship refers to the relationship between two nodes that are not directly connected, but have some kind of correlation. For example, node 1 corresponds to the middle gas pipeline on a gas transportation route, and node 2 corresponds to the terminal gas pipeline on the same gas transportation route. Although the middle gas pipeline and the terminal gas pipeline are not directly connected, they belong to the gas transportation upstream and downstream relationships, therefore, the relationship between node 1 and node 2 is a logical connection. The attribute of the edge reflecting the logical connection relationship is the logical connection feature, and the logical connection feature includes the correlation relationship between the two nodes connected by the edge.

The fault transfer distribution model refers to the model used to determine the fault transfer distribution. In some embodiments, the fault transfer distribution model may be a graph neural network (GNN) model.

In some embodiments, the input to the fault transfer distribution model 540 may include the estimated location distribution graph 530 and the output may include the fault transfer distribution 550.

In some embodiments, each node of the estimated location distribution graph 530 may output a fault transfer distribution 550 for the node at at least one future moment. For more on fault transfer distributions, see FIG. 4 and its related description.

In some embodiments, the fault transfer distribution model 540 may be trained solely based on historical data. In some embodiments, the training samples of the fault transfer distribution model 540 may be obtained based on historical data, and the labels of the training samples may be determined by manual labeling or automatic labeling.

In some embodiments of the disclosure, the estimated location distribution graph is processed through the fault transfer distribution model, and the fault transfer distribution of each node in the estimated location distribution graph is obtained, which may reduce the types of data input into the model and improve the efficiency of the model processing data.

Some embodiments of the disclosure also provide a computer-readable storage medium, the storage medium stores computer instructions, after the computer reads the computer instructions in the storage medium, the computer executes the method for smart gas maintenance management order dispatch warning.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the system components described above may be implemented by hardware devices, they may also be implemented by a software-only solution, such as installing the described system on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, disclosures, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other variants may also fall within the scope of this description. Therefore, as examples rather than restrictions, alternative configurations of the embodiments of this description may be considered to be consistent with the instruction of this description. Correspondingly, the embodiments of this description are not limited to the embodiments of the present disclosure specifically introduced and described in this description.

We claim:

1. A method for smart gas maintenance management order dispatching warning, wherein the method is executed by a processor in a smart gas management platform of an Internet of Things system for smart gas maintenance management order dispatch warning, the Internet of Things system further includes a smart gas user platform, a smart gas service platform, a smart gas sensing network platform, and a smart gas object platform, wherein the smart gas management platform includes an assignment module, a warning module, a warning monitoring module, a traffic warning value determination module, and a fault warning value determination module; the method comprising:

determining a warning characteristic of a gas work order in response to the assignment module assigning the gas work order to an order receiver; wherein the warning characteristic at least includes a traffic warning value and a fault warning value, and determining the warning characteristic of the gas work order comprises:

determining the traffic warning value based on a fault location characteristic of the gas work order through the traffic warning value determination module;

determining the fault warning value based on a gas fault characteristic of the gas work order through the fault warning value determination module, wherein the determining the fault warning value based on a gas fault characteristic of the gas work order through a fault warning value determination module includes:

determining a fault transfer distribution by processing an estimated location distribution graph by a fault transfer distribution model, wherein the estimated location distribution graph is constructed based on the gas fault characteristic and an estimated location distribution, wherein the estimated location distribution includes at least one estimated location and an estimated probability of the at least one estimated location, the at least one estimated location refers to a location where a gas fault occurs at a current or future time, the estimated probability refers to a probability of the gas fault occurring at the estimated location, the estimated location includes a first type of estimated location and a second type of estimated location, the first type of estimated location is a location where the gas fault has occurred currently, the second type of estimated location is a surrounding or associated location of the location where the gas fault has occurred, and an estimated probability of the second type of estimated location is determined based on a distance or correlation between the second type of estimated location and the first type of estimated location;

the fault transfer distribution includes a gas fault corresponding to the gas fault characteristic, a severity of that gas fault, a future moment at which the gas fault is transferred, and a transfer probability of the gas fault being transferred at the future moment;

the estimated location distribution graph includes nodes and edges, the nodes refer to the estimated location, a property of the nodes includes a node type, a gas fault characteristic, and gas monitoring data, the gas fault characteristic includes a fault type of the gas fault currently occurring at the nodes, the edges reflect a connection relationship between different nodes, and the connection relationship includes a physical connection relationship and a logical connection relationship; and the fault transfer distribution model is a graph neural network (GNN) model, an input to the fault transfer distribution model includes the estimated location distribution graph, and an output of the fault transfer distribution model includes the fault transfer distribution, wherein each node of the estimated location distribution graph outputs a fault transfer distribution for the node at least one future moment; and the fault transfer distribution model is obtained by a training process including:
obtaining a plurality of training samples and labels; and
obtaining the fault transfer distribution model through training based on the plurality of training samples and the labels;
determining the fault warning value based on the fault transfer distribution; and
in response to the warning monitoring module monitoring that the warning characteristic meets a preset condition, providing a warning to the order receiver by the warning module.

2. The method of claim 1, wherein the fault location characteristic comprises the estimated location distribution; and
determining the traffic warning value based on the fault location characteristic of the gas work order comprises:
determining at least one priority processing route based on the estimated location distribution; and
determining the traffic warning value based on the at least one priority processing routes.

3. The method of claim 2, wherein determining at least one priority processing route based on the estimated position distribution comprises:
generating a plurality of candidate processing routes based on the estimated location distribution;
determining an evaluation value of each candidate processing route based on a traffic congestion value and a fault handling priority value of each candidate processing route; and
determining the traffic warning value based on the at least one priority processing route.

4. The method of claim 2, wherein the determining of the traffic warning value based on the at least one priority processing route comprises:
determining the traffic warning value based on a count of at least one the priority processing route, traffic congestion information, and a degree of traffic congestion dispersion at a future moment.

5. The method of claim 1, wherein determining the fault warning value based on the fault transfer distribution comprises:
obtaining a current fault moment;
determining at least one future fault moment based on the fault transfer distribution; and
determining the fault warning value based on a time interval between the current fault moment and the at least one future fault moment.

6. The method of claim 1, wherein the preset condition comprises that:
the traffic warning value is greater than a traffic warning threshold or the fault warning value is greater than a fault warning threshold.

7. An Internet of things system for smart gas maintenance management order dispatch warning, comprising a smart gas user platform, a smart gas service platform, a smart gas management platform, a smart gas sensing network platform, and a smart gas object platform, wherein the smart gas management platform includes an assignment module, a warning module, a warning monitoring module, a traffic warning value determination module, and a fault warning value determination module;

the smart gas management platform is used to:
in response to the assignment module assigning a gas work order to an order receiver, determine a warning characteristic of the gas work order; wherein the warning characteristic comprises at least a traffic warning value and a fault warning value, the determining the warning characteristic of the gas work order comprising:
determining the traffic warning value based on a fault location characteristic of the gas work order through the traffic warning value determination module; and
determining the fault warning value based on a gas fault characteristic of the gas work order through the fault warning value determination module, wherein the determining the fault warning value based on a gas fault characteristic of the gas work order through the fault warning value determination module includes:
determining a fault transfer distribution by processing an estimated location distribution graph by a fault transfer distribution model, wherein the estimated location distribution graph is constructed based on the gas fault characteristic and an estimated location distribution, wherein
the estimated location distribution includes at least one estimated location and an estimated probability of the at least one estimated location, the at least one estimated location refers to a location where a gas fault occurs at a current or future time, the estimated probability refers to a probability of the gas fault occurring at the estimated location, the estimated location includes a first type of estimated location and a second type of estimated location, the first type of estimated location is a location where the gas fault has occurred currently, the second type of estimated location is a surrounding or associated location of the location where the gas fault has occurred, and an estimated probability of the second type of estimated location is determined based on a distance or correlation between the second type of estimated location and the first type of estimated location;
the fault transfer distribution includes a gas fault corresponding to a gas fault characteristic, a severity of that gas fault, a future moment at which the gas fault is transferred, and a transfer probability of the gas fault being transferred at the future moment;
the estimated location distribution graph includes nodes and edges, the nodes refer to the estimated location, a property of the nodes includes a node type, a gas fault characteristic, and gas monitoring data, the gas fault characteristic includes a fault type of the gas fault currently occurring at the nodes, the edges reflect a connection relationship between different nodes, and the connection relationship includes a physical connection relationship and a logical connection relationship; and
the fault transfer distribution model is a graph neural network (GNN) model, an input to the fault transfer distribution model includes the estimated location distribution graph, and an output of the fault transfer distribution model includes the fault transfer distribution, wherein each node of the estimated location distribution graph output a fault transfer distribution for the node at least one future moment; and the fault transfer distribution model is obtained by a training process including:

obtaining a plurality of training samples and labels;

obtaining the fault transfer distribution model through training, based on the plurality of training samples and the labels;

determining the fault warning value based on the fault transfer distribution; and in response to the warning monitoring module monitoring that the warning characteristic meets a preset condition, providing a warning to the order receiver by the warning module.

8. A non-transitory computer readable storage medium, the computer readable storage medium storing computer instructions, wherein when the computer instructions are executed by a processor, the method for smart gas maintenance management order dispatch warning of claim 1 is implemented.

\* \* \* \* \*